(12) United States Patent
Ohira et al.

(10) Patent No.: US 12,115,466 B2
(45) Date of Patent: Oct. 15, 2024

(54) ION EXCHANGER

(71) Applicant: TOYOTA BOSHOKU KABUSHIKI KAISHA, Aichi-ken (JP)

(72) Inventors: Junko Ohira, Kariya (JP); Tomohiro Yoshida, Konan (JP); Shingo Yabe, Obu (JP); Minetaka Kawamoto, Nagoya (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 402 days.

(21) Appl. No.: 17/617,174

(22) PCT Filed: Nov. 6, 2020

(86) PCT No.: PCT/JP2020/041576
§ 371 (c)(1),
(2) Date: Dec. 7, 2021

(87) PCT Pub. No.: WO2021/095665
PCT Pub. Date: May 20, 2021

(65) Prior Publication Data
US 2022/0258071 A1    Aug. 18, 2022

(30) Foreign Application Priority Data
Nov. 12, 2019   (JP) ................................ 2019-204567

(51) Int. Cl.
*B01D 15/18*   (2006.01)
*B01D 15/36*   (2006.01)
(Continued)

(52) U.S. Cl.
CPC .......... *B01D 15/18* (2013.01); *B01D 15/361* (2013.01); *B01J 47/024* (2013.01); *H01M 8/04044* (2013.01); *H01M 2250/20* (2013.01)

(58) Field of Classification Search
CPC .......... B01J 39/19; B01J 41/14; B01J 47/028; B01J 47/04; B01D 15/18; B01D 15/361
See application file for complete search history.

(56) References Cited

U.S. PATENT DOCUMENTS 11,050,068 B2 *   6/2021   Yamaguchi ............ B01D 15/14
2018/0058781 A1   3/2018   Ohira
2018/0145349 A1   5/2018   Yamaguchi et al.

FOREIGN PATENT DOCUMENTS

JP   2018-30082   3/2018
JP   2018-83145   5/2018

OTHER PUBLICATIONS

International Search Report received in International Application No. PCT/JP2020/041576, dated Jan. 12, 2021.

* cited by examiner

*Primary Examiner* — Sharon Pregler
(74) *Attorney, Agent, or Firm* — GREENBLUM & BERNSTEIN, P.L.C.

(57) ABSTRACT

An ion exchanger includes a housing, a tube member, and an ion exchange resin. The housing includes an inlet port and an outlet port. The tube member is arranged inside the housing. The ion exchange resin is arranged between the tube member and the housing. A first flow passage and a second flow passage are formed in the housing. The first flow passage is configured to cause the coolant that has flowed in through the inlet port to flow directly to the outlet port. The second flow passage is configured to cause the coolant that has flowed in through the inlet port and passed through the ion exchange resin to flow to the outlet port. The first flow passage and the second flow passage are formed to join together in a state of being oriented in a same direction toward the outlet port.

4 Claims, 3 Drawing Sheets

(51) Int. Cl.
*B01J 47/024* (2017.01)
*H01M 8/04044* (2016.01)

ION EXCHANGER

TECHNICAL FIELD

The present disclosure relates to an ion exchanger.

BACKGROUND ART

A vehicle such as an automobile equipped with a fuel cell includes a cooling circuit for the purpose of suppressing a temperature increase of the fuel cell at the time of power generation. The cooling circuit is configured such that coolant for cooling the fuel cell flows through the cooling circuit. In such a cooling circuit, an increase in the concentration of ions in the coolant may cause corrosion of metal portions in the cooling circuit or increase the electrical conductivity of the coolant, resulting in reduction of the performance of the fuel cell. Therefore, such a cooling circuit includes an ion exchanger to remove ions contained in the coolant through ion exchange using ion exchange resin.

For example, Patent Document 1 discloses such an ion exchanger. This ion exchanger includes a housing, a tube member, and ion exchange resin. The housing includes an inlet port, into which coolant flows, and an outlet port, through which the coolant flows out. The tube member is provided inside the housing. The ion exchange resin is arranged between the outer surface of the tube member and the inner surface of the housing. Some of the coolant that has flowed into the housing through the inlet port flows directly to the outlet port. Also, some of the coolant that has flowed into the housing through the inlet port flows to the outlet port after passing through the ion exchange resin and the tube member. When the coolant passes through the ion exchange resin, ions in the coolant are removed through ion exchange by the ion exchanger.

PRIOR ART DOCUMENT

Patent Document

Patent Document 1: Japanese Laid-Open Patent Publication No. 2018-30082

SUMMARY OF THE INVENTION

Problems that the Invention is to Solve

Some of the coolant that has flowed into the housing through the inlet port flows directly to the outlet port, and some of coolant flows to the outlet port after passing through the ion exchange resin and the tube member. These flows of the coolant join together before flowing out of the housing through the outlet port. In the ion exchanger of Patent Document 1, the coolant that flows directly to the outlet port and the coolant that flows to the outlet port after passing through the ion exchange resin and the tube member join together with the flowing directions intersecting (perpendicularly) with each other. Thus, the ion exchanger of Patent Document 1 inevitably causes a turbulence in the joined flow of coolant. Such a turbulence in the joined flow of coolant increases the pressure loss of the coolant when passing through the ion exchanger.

Accordingly, it is an objective of the present disclosure to provide an ion exchanger that suppresses an increase in the pressure loss when coolant passes through the ion exchanger.

Means for Solving the Problems

Means and operational advantages for solving the above-described problem will now be described.

To achieve the foregoing objective, an ion exchanger is provided that includes a housing that includes an inlet port, into which a coolant flows, and an outlet port, through which the coolant flows out, a tube member that is arranged inside the housing, and an ion exchange resin that is arranged between an outer surface of the tube member and an inner surface of the housing. The ion exchanger is configured such that some of the coolant that has flowed into the housing through the inlet port flows directly to the outlet port, and some of the coolant that has flowed into the housing through the inlet port flows to the outlet port after passing through the ion exchange resin and the tube member. A first flow passage and a second flow passage are formed in the housing. The first flow passage is configured to cause the coolant that has flowed in through the inlet port to flow directly to the outlet port. The second flow passage is configured to cause the coolant that has flowed in through the inlet port and passed through the ion exchange resin to flow to the outlet port. The first flow passage and the second flow passage are formed to join together in a state of being oriented in a same direction toward the outlet port.

With the above-described configuration, the first flow passage and the second flow passage are formed to join together in a state of being oriented in the same direction toward the inlet port. Accordingly, the coolant that has passed through the first flow passage and the coolant that has passed through the second flow passage join together with the flowing directions agreeing with each other. This suppresses the occurrence of turbulence in the joined flow of coolant. Thus, when the coolant passes through the ion exchanger, the pressure loss is not increased due to the occurrence of turbulence in the joined flow of coolant. The ion exchange resin is arranged between the inner surface of the housing and the outer surface of the tube member. With the above-described configuration, since the interior of the tube member is used as a flow passage for the coolant, the coolant passes through the ion exchange resin in a direction in which the tube member extends. Since the coolant passes through the ion exchange resin in the above-described manner, an increase in the pressure loss when the coolant passes through the ion exchanger is suppressed, and the ion exchange efficiency between the ion exchange resin and the coolant is increased.

MODES FOR CARRYING OUT THE INVENTION

An ion exchanger according to one embodiment will now be described with reference to FIGS. 1 to 5.

Figure 1:
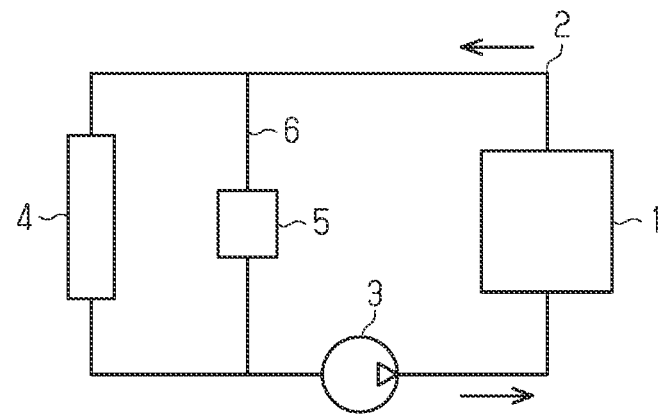
FIG. 1 is a schematic diagram showing the overall configuration of a cooling circuit provided with an ion exchanger.

As shown in FIG. 1, a vehicle equipped with a fuel cell 1 is provided with a cooling circuit 2, in which coolant flows to cool the fuel cell 1. A coolant containing ethylene glycol (long life coolant) or the like is used. The cooling circuit 2 includes a pump 3, and is configured to drive the pump 3 to circulate the coolant.

In the cooling circuit 2, the fuel cell 1 is arranged in a section on the downstream side of the pump 3. The cooling circuit 2 includes a radiator 4 in a section that is downstream of the fuel cell 1 and upstream of the pump 3. The fuel cell 1, of which the temperature increases during power generation, is cooled by the coolant circulating through the cooling circuit 2 and passing through the fuel cell 1. When heated by taking heat from the fuel cell 1, the coolant is cooled by the outside air when passing through the radiator 4, and then flows to the pump 3.

The cooling circuit 2 is provided with an ion exchanger 5 and a bypass pipe 6 for causing the flow of coolant to the ion exchanger 5. The ion exchanger 5 is configured to adsorb ions in the coolant so as to remove ions from the coolant. One end of the bypass pipe 6 is connected to a section of the cooling circuit 2 that is downstream of the fuel cell 1 and upstream of the radiator 4. The other end of the bypass pipe 6 is connected to a section of the cooling circuit 2 that is downstream of the radiator 4 and upstream of the pump 3. The ion exchanger 5 is provided in the middle of the bypass pipe 6.

In the cooling circuit 2, when the circulating coolant reaches the section downstream of the fuel cell 1, some of the coolant flows into the bypass pipe 6, instead of flowing toward the radiator 4. The coolant that has flowed into the bypass pipe 6 in this manner undergoes ion removal when passing through the ion exchanger 5 and then flows to a section of the cooling circuit 2 that is downstream of the radiator 4 and upstream of the pump 3.

The ion exchanger 5 will now be described.

Figure 2:
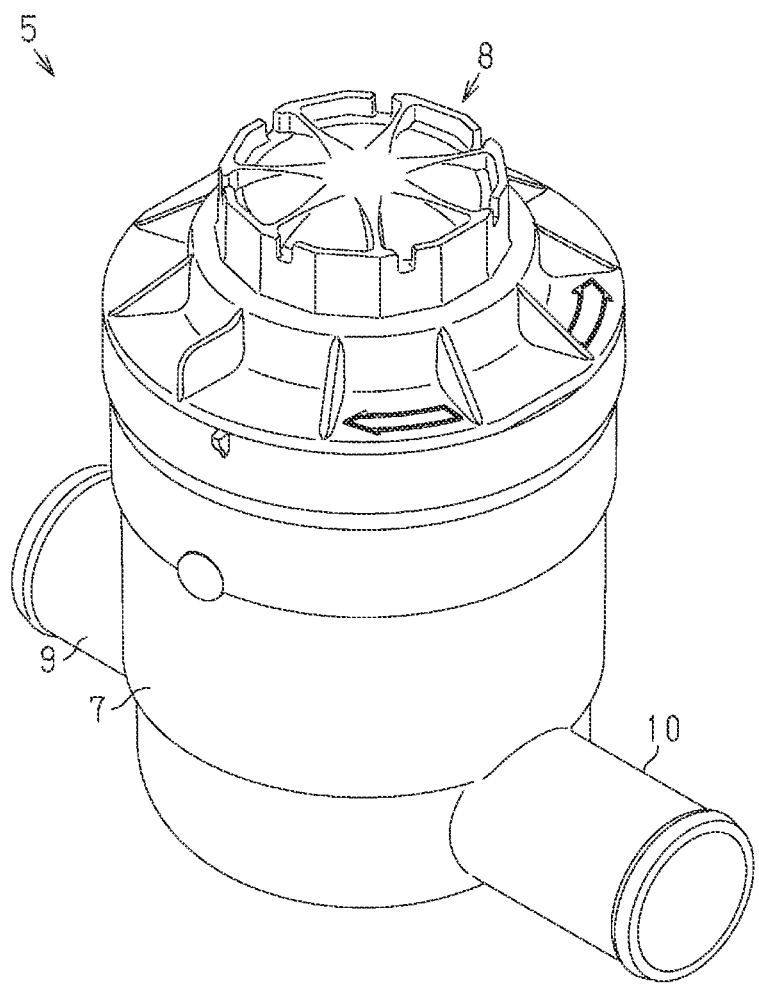
FIG. 2 is a perspective view showing the ion exchanger.

As shown in FIG. 2, the ion exchanger 5 includes a housing 7 and a cap 8. The housing 7 has a cylindrical shape that extends in the vertical direction and opens upward. The cap 8 closes the upper opening of the housing 7 by being threaded into the opening. The housing 7 includes an inlet pipe 9 and an outlet pipe 10, which are connected to the interior of the housing 7. The inlet pipe 9 is connected to a section of the bypass pipe 6 (FIG. 1) that is upstream of the ion exchanger 5. The outlet pipe 10 is connected to a section of the bypass pipe 6 that is downstream of the ion exchanger 5. The inlet pipe 9 and the outlet pipe 10 are formed integrally with the housing 7. The ion exchanger 5 is mounted on the vehicle with a fastener (not shown).

Figure 3:
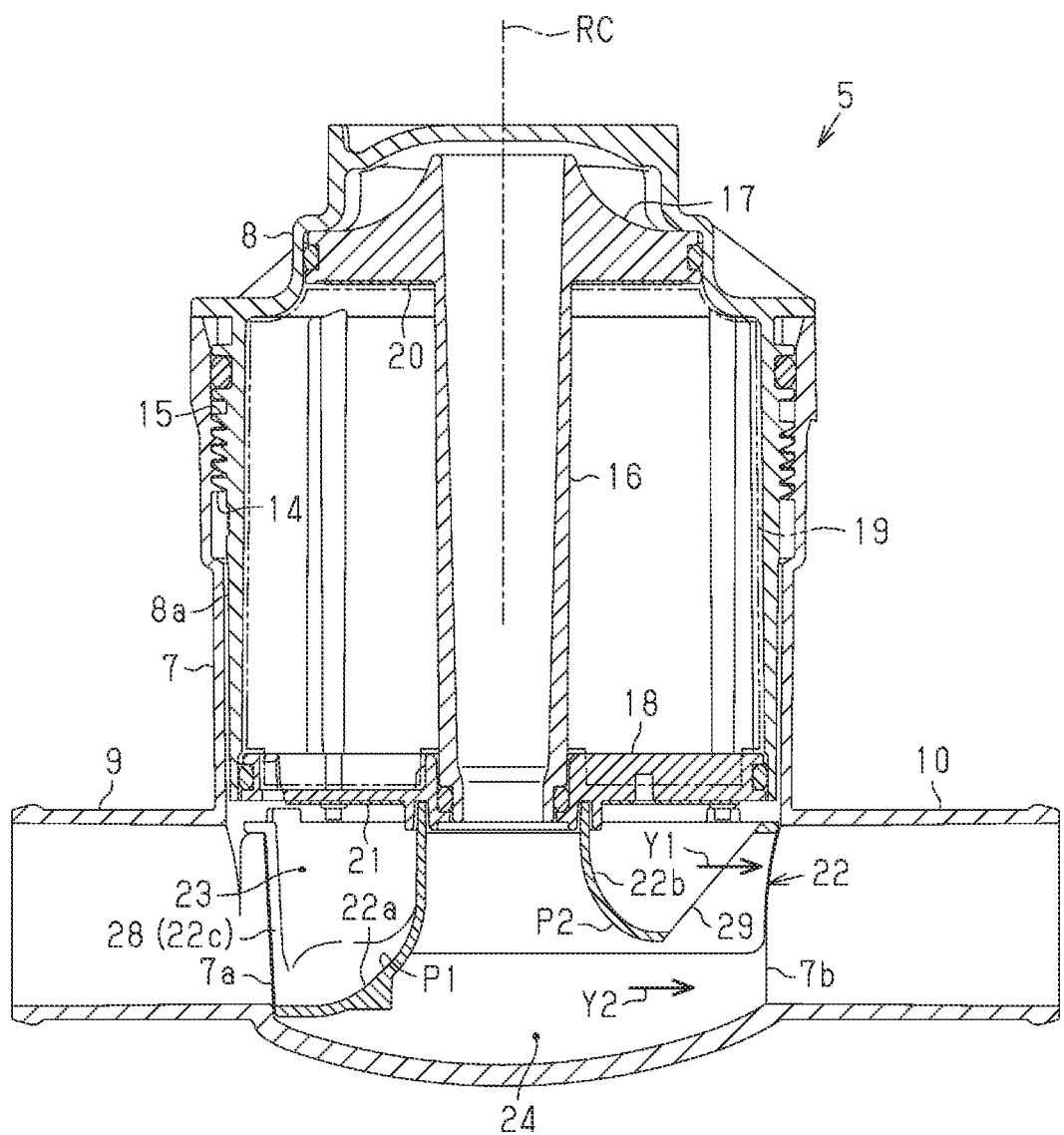
FIG. 3 is a cross-sectional view showing the ion exchanger.

As shown in FIG. 3, the housing 7 is provided with an inlet port 7a, through which the coolant flows in, and an outlet port 7b, through which the coolant flows out. The inlet port 7a is located at the lower end of the side wall of the housing 7 and on one side in the radial direction (left side as viewed in FIG. 3). The inlet port 7a is connected to the inlet pipe 9. The outlet port 7b is located at the lower end of the side wall of the housing 7 and on the other side in the radial direction (right side as viewed in FIG. 3). The outlet port 7b is connected to the outlet pipe 10.

The cap 8 of the ion exchanger 5 has a cylindrical body portion 8a, which can be threaded into the upper end opening of the housing 7. The body portion 8a is formed to extend in the vertical direction. The body portion 8a has an external thread 15 on the outer circumferential surface. The external thread 15 can be engaged with an internal thread 14, which is formed in the inner circumferential surface of the opening of the housing 7. When the external thread 15 of the body portion 8a is engaged with the internal thread 14 of the housing 7, the outer circumferential surface of the body portion 8a is arranged to conform to the inner circumferential surface of the housing 7, and the upper end opening of the housing 7 is closed by the cap 8.

The cap 8, which is attached to the housing 7, includes a tube member 16, which extends in the vertical direction inside the body portion 8a. The tube member 16 includes a ring portion 17 at the upper end. The ring portion 17 projects in a direction perpendicular to the axis of the tube member 16. The tube member 16 also includes a removable ring member 18 at the lower end. The ring member 18 projects in a direction perpendicular to the axis of the tube member 16. The outer circumference of the ring portion 17 is fitted in the upper end of the inner circumferential surface of the cap 8. The outer circumference of the ring member 18 is fitted in the lower end of the inner circumferential surface of the cap 8 (the body portion 8a). The tube member 16 is thus installed in the cap 8. At this time, a gap of a predetermined size exists between the upper end of the tube member 16 and the ceiling surface (the upper end of the inner surface) of the cap 8.

The ring portion 17 and the ring member 18 are configured to allow coolant to pass through in the vertical direction. Ion exchange resin 19 is provided in the space between the ring portion 17 and the ring member 18 and between the outer circumferential surface of the tube member 16 and the inner circumferential surface of the cap 8 (the body portion 8a). A mesh 20 is attached to the lower surface of the ring portion 17, and a mesh 21 is attached to the lower surface of the ring member 18. The meshes 20, 21 restrict the ion exchange resin 19 from moving upward above the ring portion 17, and from moving downward below the ring member 18.

The cap 8, the tube member 16, and the ion exchange resin 19 are integrated into a cartridge. Thus, the ion exchange resin 19 can be replaced together with the cap 8 and the tube member 16 by attaching the cap 8 to or removing the cap 8 from the housing 7. The tube member 16 is located inside the housing 7 when the cap 8 is attached to the housing 7. In this state, the outer circumferential surface of the body portion 8a of the cap 8 conforms to the inner circumferential surface of the housing 7. Therefore, the ion exchange resin 19, which is located between the inner circumferential surface of the body portion 8a and the outer circumferential surface of the tube member 16, is located between the outer circumferential surface of the tube member 16 and the inner circumferential surface of the housing 7.

A separator 22, which is formed separately from the housing 7, is provided at the lower end inside the housing 7. The separator 22 includes a bottom wall 22a and a tubular wall 22b. The bottom wall 22a divides the lower end portion in the housing 7 vertically. The tubular wall 22b connects the section below the bottom wall 22a to the lower end of the tube member 16. The separator 22 further includes a peripheral wall 22c, which is connected to the outer edge of the bottom wall 22a. The peripheral wall 22c projects in the same direction as the direction in which the tubular wall 22b projects from the bottom wall 22a, and is in contact with the inner surface of the bottom of the housing 7. The separator 22 functions as a flow dividing unit. Specifically, the separator 22 is configured to divide the flow of coolant that has flowed into the housing 7 through the inlet port 7a into a flow flowing directly to the outlet port 7b and a flow flowing toward the ion exchange resin 19. The separator 22 is further configured to cause the coolant that has passed through the ion exchange resin 19 to flow to the outlet port 7b.

More specifically, the separator 22 defines the section above the bottom wall 22a as a first flow passage 23. The first flow passage 23 is configured to cause the coolant that has flowed into the housing 7 through the inlet port 7a to flow directly to the outlet port 7b, and also cause some of the coolant that has flowed into the housing 7 through the inlet port 7a to flow toward the ion exchange resin 19. The coolant that has flowed toward the ion exchange resin 19 passes through the ion exchange resin 19 from bottom to top, passes through the tube member 16 from top to bottom, and flows into the tubular wall 22b of the separator 22.

Also, the separator 22 defines the section below the bottom wall 22a as a second flow passage 24. The second flow passage 24 is connected to the tube member 16 via the tubular wall 22b of the separator 22. The first flow passage 23 causes some of the coolant that has flowed into the housing 7 through the inlet port 7a to flow toward the ion exchange resin 19. The second flow passage 24 receives, via the tubular wall 22b of the separator 22, the coolant that has flowed toward the ion exchange resin 19, and causes the coolant to flow to the outlet port 7b. That is, the second flow passage 24 is configured to receive, via the tubular wall 22b of the separator 22, the coolant that has passed through the tube member 16 from top to bottom after passing through the ion exchange resin 19 from bottom to top, and to cause this coolant to flow toward the outlet port 7b. In the ion exchanger 5, when the coolant passes through the ion exchange resin 19 in the above-described manner, ions in the coolant are removed through ion exchange. The coolant, from which ions have been removed, flows out from the housing 7 through the outlet port 7b.

The first flow passage 23 and the second flow passage 24 are formed to join together in a state of being oriented in the same direction toward the outlet port 7b. That is, the separator 22 is formed such that the first flow passage 23 and the second flow passage 24 join together in the above-described manner. As shown in FIG. 3, the separator 22 of the present embodiment is formed such that the coolant that has passed through the first flow passage 23 flows toward the outlet port 7b as indicated by arrow Y1, and the coolant that has passed through the second flow passage 24 flows toward the outlet port 7b as indicated by arrow Y2. Arrow Y1 and arrow Y2 are oriented in the same direction.

Next, the shape of the separator 22 will be described in detail.

Figure 4:
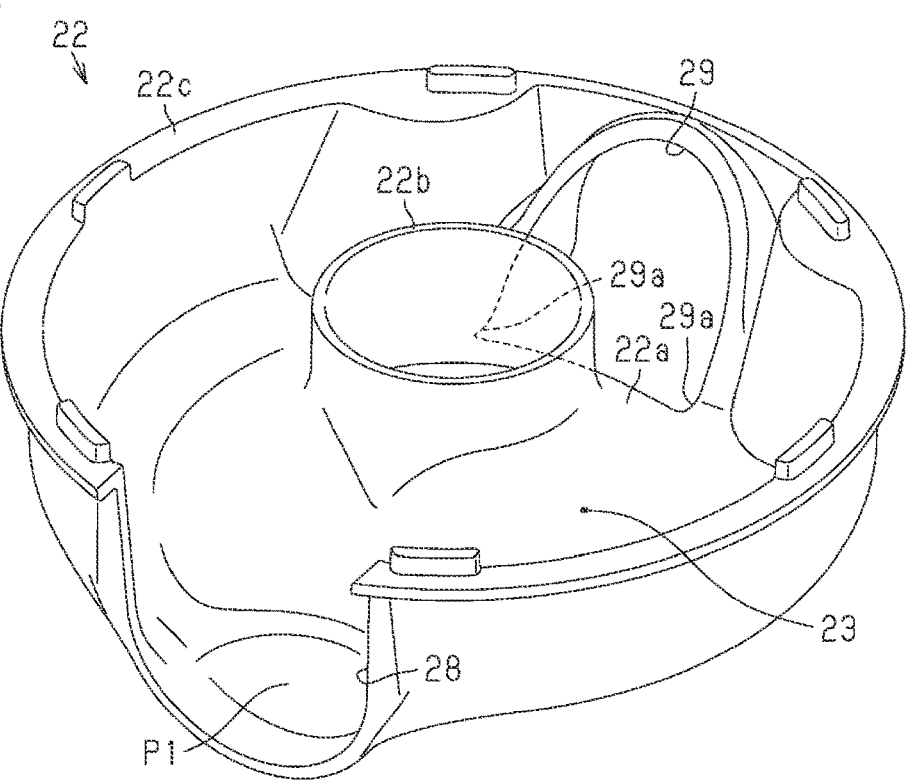
FIG. 4 is a perspective view showing a separator.
Figure 5:
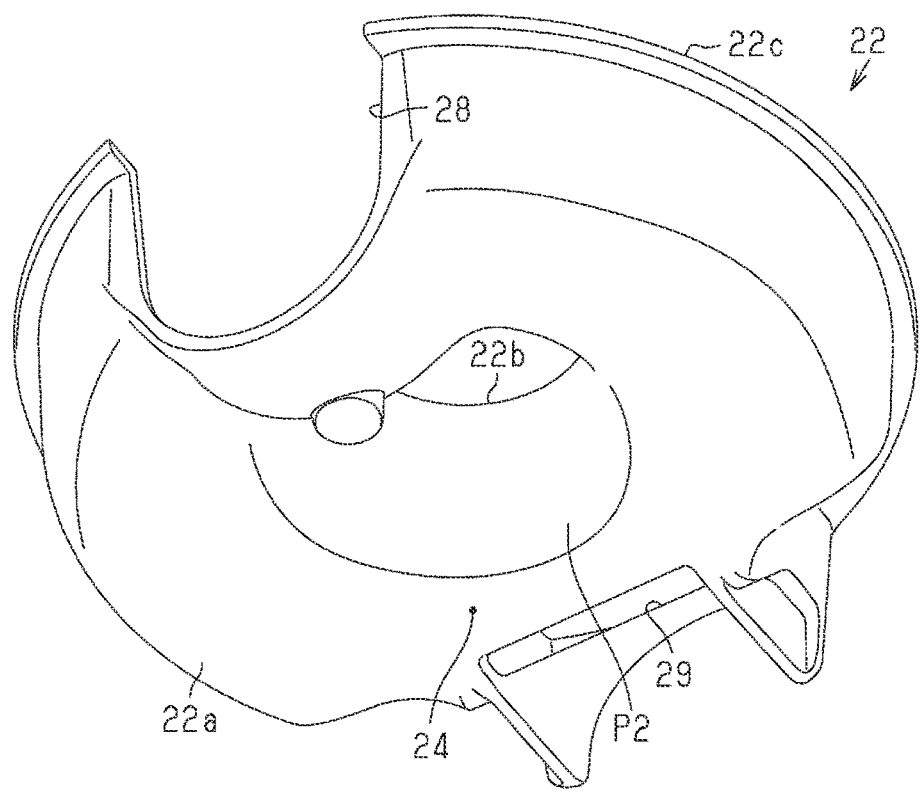
FIG. 5 is a perspective view showing the separator.

As shown in FIGS. 4 and 5, the bottom wall 22a, the tubular wall 22b, and the peripheral wall 22c of the separator 22 function as walls that form the first flow passage 23 and the second flow passage 24, through which the coolant flows. The bottom wall 22a, the tubular wall 22b, and the peripheral wall 22c are thinner than the housing 7. The peripheral wall 22c has a cutout 28 in a portion on one side in the radial direction. The cutout 28 connects the inlet port 7a of the housing 7 (FIG. 3) and the first flow passage 23 to each other. The peripheral wall 22c has a through-hole 29 in a portion on the other side in the radial direction. The through-hole 29 connects the outlet port 7b of the housing 7 (FIG. 3) and the first flow passage 23 to each other.

The lower end of the through-hole 29 reaches the bottom wall 22a. As shown in FIG. 3, the through-hole 29 is formed in a section in the peripheral wall 22c and the bottom wall 22a of the separator 22 that is closest to the outlet port 7b. The through-hole 29 is formed at a position that corresponds to the outlet port 7b in the axial direction of the outlet pipe 10.

As shown in FIG. 4, section P1 in the bottom wall 22a, which corresponds to the cutout 28 of the peripheral wall 22c, has a curved shape. Specifically, section P1 has a curved shape that gradually changes the direction of the coolant that has flowed into the first flow passage 23 through the cutout 28 in a horizontal direction, into a direction toward the ion exchange resin 19, that is, the upward direction as viewed in FIG. 4. Some of the coolant of which the flowing direction has been changed does not flow into the ion exchange resin 19, but flows toward the through-hole 29 in the first flow passage 23, while flowing along the peripheral wall 22c and around the tubular wall 22b. This coolant flows to the outlet port 7b through the through-hole 29.

As shown in FIG. 5, section P2 in the bottom wall 22a, which is continuous with the tubular wall 22b, also has a curved shape. Specifically, section P2 is configured to gradually change the direction of the coolant that has flowed downward into the second flow passage 24 through the interior of section P2, into a direction toward the outlet port 7b, that is, the horizontal direction. Section P2 has a curved shaped to achieve this change in the flowing direction. More specifically, section P2 is formed such that the inner diameter gradually increases toward the lower end, such that section P2 has a curved shape.

In a state in which the separator 22 is installed in the housing 7 as shown in FIG. 3, the through-hole 29 of the separator 22 is located at a position that corresponds to the outlet port 7b. Also, since the separator 22 is installed in the housing 7, the first flow passage 23 is formed above the bottom wall 22a of the separator 22, and the second flow passage 24 is formed below the separator 22. Further, since the through-hole 29 is formed in the peripheral wall 22c and the bottom wall 22a of the separator 22, the first flow passage 23 and the second flow passage 24 join together at a position in the separator 22 that is closest to the outlet port 7b.

An operation of the ion exchanger 5 will now be described.

In the ion exchanger 5, some of the coolant that has flowed into the housing 7 through the inlet port 7a is caused to flow toward the ion exchange resin 19 by the first flow passage 23. Also, some of the coolant that has flowed into the housing 7 through the inlet port 7a is not caused to flow toward the ion exchange resin 19, but is caused to flow directly to the outlet port 7b through the through-hole 29 of the separator 22. The coolant that has flowed toward the ion exchange resin 19 from the first flow passage 23 passes through the ion exchange resin 19 from bottom to top, and then passes through the tube member 16 from top to bottom. Next, the coolant flows into the second flow passage 24 from the tube member 16 through the interior of the tubular wall 22b of the separator 22. Subsequently, the coolant flowing in the second flow passage 24 is caused to flow to the outlet port 7b.

The coolant that flows in the first flow passage 23 and the coolant that flows in the second flow passage 24 join together in the vicinity of the through-hole 29 of the separator 22 in the housing 7, and then flow out of the housing 7 through the outlet port 7b. The first flow passage 23 and the second flow passage 24 are formed by the separator 22 so as to join together in a state of being oriented in the same direction toward the outlet port 7b. Accordingly, the coolant that has passed through the first flow passage 23 and the coolant that has passed through the second flow passage 24 join together with the flowing directions agreeing with each other. This suppresses the occurrence of turbulence in the joined flow of coolant.

The present embodiment, as described above, has the following advantages.

(1) It is possible to suppress the occurrence of turbulence in the flow of coolant after the coolant that has passed through the first flow passage 23 and the coolant that has passed through the second flow passage 24 join together. This prevents the pressure loss of the coolant when passing through the ion exchanger 5 from being increased due to turbulence in the flow of coolant. The ion exchange resin 19 is arranged between the inner circumferential surface of the housing 7 and the outer circumferential surface of the tube member 16. The ion exchanger 5 is configured such that the interior of the tube member 16 is used as a flow passage for the coolant, so that the coolant passes through the ion exchange resin 19 in the vertical direction (from bottom to top in the present embodiment). Since the coolant passes through the ion exchange resin 19 in the above-described manner, an increase in the pressure loss when the coolant passes through the ion exchanger 5 is suppressed, and the ion exchange efficiency between the ion exchange resin 19 and the coolant is increased.

(2) The first flow passage 23 has a function of causing some of the coolant that has flowed into the housing 7 through the inlet port 7a to flow toward the ion exchange resin 19, as well as a function of causing some of the coolant that has flowed into the housing 7 through the inlet port 7a to flow directly to the outlet port 7b. On the other hand, the second flow passage 24 has a function of causing the coolant that has passed through the ion exchange resin 19 and the tube member 16 to flow to the outlet port 7b. Since the first flow passage 23 has more functions than the second flow passage 24, the first flow passage 23 tends to be larger than the second flow passage 24. If the first flow passage 23 were located below the second flow passage 24 and at the lower end of the housing 7, the size of the entire ion exchanger 5 would inevitably be large. However, in the ion exchanger 5, the first flow passage 23 is located above the second flow passage 24, so that the size of the ion exchanger 5 is not increased by placing the first flow passage 23 at the lower end of the housing 7.

(3) Tests were carried out by gradually shifting the joining portion of the first flow passage 23 and the second flow passage 24 from a position in the separator 22 close to the outlet port 7b to a position in the separator 22 far from the outlet port 7b, and the pressure loss when the coolant passed through the ion exchanger 5 at a constant flow rate was measured in each case. The results below were obtained. When the joining portion was located at a position farthest from the outlet port 7b, the pressure loss was 25.1 kpa. When the joining portion was located at a position closest to the outlet port 7b, the pressure loss was 19 kpa. When the joining portion was located at a middle position between the position farthest from the outlet port 7b and the position closest to the outlet port 7b, the pressure loss was 40.7 kpa. Comparison of the above measurements showed that when the position of the joining portion was close to the outlet port 7b, the pressure loss was low. Accordingly, if the first flow passage 23 and the second flow passage 24 are joined at a position in the separator 22 that is closest to the outlet port 7b, it is possible to reduce the pressure loss when coolant passes through the ion exchanger 5.

(4) The through-hole 29 is configured to join the first flow passage 23 and the second flow passage 24 together, and is formed in a section in the peripheral wall 22c and the bottom wall 22a of the separator 22 that is closest to the outlet port 7b. Further, the through-hole 29 is formed at a position that corresponds to the outlet port 7b in the axial direction of the outlet pipe 10. Therefore, after the coolant that has passed through the first flow passage 23 and the coolant that has passed through the second flow passage 24 join together in the vicinity of the through-hole 29, the joined flow of coolant readily flows to the outlet pipe 10 from the outlet port 7b.

The above-described embodiment may be modified as follows. The above-described embodiments and the following modifications can be combined as long as the combined modifications remain technically consistent with each other.

The outlet pipe 10 and the bottom surface at the lower end inside the housing 7 may have the following structure.

The outlet pipe 10 be inclined such that the outlet pipe 10 declines as the distance from the side wall of the housing 7 increases. The bottom surface at the lower end inside the housing 7 may include a lowest section at the position opposed to the space inside the tubular wall 22b, and that lowest section may be located below the lowest section of the outlet port 7b. Further, the bottom surface may include a first guide surface and a second guide surface. The first guide surface is inclined and extends toward the outlet port 7b from the lowest section of the bottom surface to a position at the height corresponding to the lowest section of the outlet port 7b. The second guide surface extends toward the lower end of the outlet port 7b from the upper end of the first guide surface.

A comparative example assumes that there is a step between the outlet port 7b and the bottom surface of the lower end inside the housing 7. In this case, when the coolant that has passed through the first flow passage 23 and the coolant that has passed through the second flow passage 24 join together, the flow of the coolant that has passed through the second flow passage 24 is sloshed up by of the step. The sloshed flow of coolant pushes up the flow of coolant that has passed through the first flow passage 23. As a result, the joined flow of coolant does not smoothly flow from the outlet port 7b to the outlet pipe 10. That is, the joined flow of coolant does not smoothly flow into the outlet pipe 10, which is inclined so as to decline as the distance from the housing 7 increases. However, the above-described step is eliminated by the first guide surface and the second guide surface, so that the flow of coolant that has passed through the second flow passage 24 is not sloshed up by the step. The joined flow of coolant is therefore not prevented from flowing smoothly from the outlet port 7b to the outlet pipe 10.

The outlet pipe 10 may be inclined such that the outlet pipe 10 declines as the distance from the side wall of the housing 7 increases. Also, the through-hole 29 may be formed in the peripheral wall 22c and the bottom wall 22a of the separator 22 in an area onto which the outlet port 7b is projected in the axial direction of the outlet pipe 10. In this case, the lower end of the through-hole 29 may include inside corners 29a as shown in FIG. 4. The width in the horizontal direction of the section in which the inside corners 29a are formed is greater than the width of the section of the through-hole 29 above the center in the vertical direction (upper portion).

This configuration allows the flow of coolant that has passed through the first flow passage 23 to be pushed downward in the upper portion of the through-hole 29. Therefore, after the coolant that has passed through the first flow passage 23 and the coolant that has passed through the second flow passage 24 join together, the joined flow of coolant readily flows toward the outlet port 7b and the outlet pipe 10. Also, the flow of coolant that has passed through the first flow passage 23, in other words, the flow of coolant that has passed through the through-hole 29, has a relatively high flow rate at the lower end of the through-hole 29, the width of which is increased by the inside corners 29a. The portion of the increased flow rate reaches the vicinity of the center of the outlet pipe 10, which is inclined as described above, so as to flow smoothly along the center of the outlet pipe 10. In this manner, after the coolant that has passed through the first flow passage 23 and the coolant that has passed through the second flow passage 24 join together, the joined flow of coolant readily flows into the outlet port 7b and the outlet pipe 10 along the center of the inclined outlet pipe 10.

The joining portion of the first flow passage 23 and the second flow passage 24 does not necessarily need to be located at a position in the separator 22 that is closest to the outlet port 7b.

The positional relationship of the first flow passage 23 and the second flow passage 24 in the vertical direction may be reversed.

In place of the separator 22, a flow dividing unit that has the same function as the separator 22 may be formed integrally with the housing 7.

The coolant may pass through the ion exchange resin 19 from top to bottom. In this case, the ion exchanger is configured such that some of the coolant that has flowed into the housing 7 through the inlet port 7a flows directly to the outlet port 7b, and some of the coolant that has flowed into the housing 7 through the inlet port 7a flows to the tube member 16. Also, the ion exchanger is configured such that the coolant that has passed through the tube member 16 passes through the ion exchange resin 19 from top to bottom. Further, the ion exchanger is configured such that the coolant that has passed through the ion exchange resin 19 flows to the outlet port 7b. That is, the first flow passage and the second flow passage are formed to create such flows of coolant.

DESCRIPTION OF THE REFERENCE NUMERALS

1 . . . Fuel Cell; 2 . . . Cooling Circuit; 3 . . . Pump; 4 . . . Radiator; 5 . . . Ion Exchanger; 6 . . . Bypass Pipe; 7 . . . Housing; 7a . . . Inlet Port; 7b . . . Outlet Port; 8 . . . Cap; 8a . . . Body Portion; 9 . . . Inlet Pipe; 10 . . . Outlet Pipe; 14 . . . Internal Thread; 15 . . . External Thread; 16 . . . Tube Member; 17 . . . Ring Portion; 18 . . . Ring Member; 19 . . . Ion Exchange Resin; 20 . . . Mesh; 21 . . . Mesh; 22 . . . Separator; 22a . . . Bottom Wall; 22b . . . Tubular Wall; 22c . . . Peripheral Wall; 23 . . . First Flow Passage; 24 . . . Second Flow Passage; 28 . . . Cutout; 29 . . . Through-Hole; 29a . . . Inside Corners

The invention claimed is:

1. An ion exchanger, comprising:
a housing that includes an inlet port, into which a coolant flows, and an outlet port, through which the coolant flows out, wherein the housing extends in a vertical direction;
a tube member that is arranged inside the housing so that a center axis of the tube member extends in the vertical direction; and
an ion exchange resin that is arranged between an outer surface of the tube member and an inner surface of the housing, wherein
the ion exchanger is configured such that
some of the coolant that has flowed into the housing through the inlet port flows directly to the outlet port, and
some of the coolant that has flowed into the housing through the inlet port flows to the outlet port after passing through the ion exchange resin and the tube member, wherein
a first flow passage and a second flow passage are formed in the housing,
the first flow passage is configured to cause the coolant that has flowed in through the inlet port to flow directly to the outlet port,
the second flow passage is configured to cause the coolant that has flowed in through the inlet port and passed through the ion exchange resin to flow to the outlet port, and
the first flow passage and the second flow passage are formed to join together in a state of being oriented in a same direction toward the outlet port, wherein
the inlet port and the outlet port are located at a lower end of the housing,
the ion exchanger further comprises a separator that is provided beneath the tube member in the vertical direction, wherein a region of the housing that is beneath the tube member in the vertical direction defines a lower end portion in the housing,
the separator includes:
a bottom wall that divides the lower end portion in the housing vertically; and
a tubular wall that connects a section below the bottom wall to a lower end of the tube member, and
the separator defines a section above the bottom wall as the first flow passage, and defines the section below the bottom wall as the second flow passage.

2. The ion exchanger according to claim 1, wherein the first flow passage and the second flow passage join together at a position in the separator that is closest to the outlet port.

3. The ion exchanger according to claim 2, wherein
the outlet port is formed in a side wall of the housing,
the ion exchanger further comprises a pipe that is connected to the side wall,
the outlet port is connected to the pipe,
the separator includes a peripheral wall that is connected to an outer edge of the bottom wall,
the peripheral wall projects in a same direction as a direction in which the tubular wall projects from the bottom wall, the peripheral wall being in contact with the inner surface of the housing,
a through-hole is formed in a section in the peripheral wall and the bottom wall of the separator that is closest to the outlet port, the through-hole being configured to cause the first flow passage and the second flow passage to join together, and
the through-hole is located at a position that corresponds to the outlet port in an axial direction of the pipe.

4. The ion exchanger according to claim 3, wherein
the pipe is inclined such that the pipe declines as a distance from the side wall of the housing increases,
a lowest section of a bottom surface in the lower end portion of the housing is located below a lowest section of the outlet port,
the bottom surface includes a first guide surface and a second guide surface,
the first guide surface is inclined and extends toward the outlet port from the lowest section of the bottom surface to a position at a height corresponding to the lowest section of the outlet port, and the second guide surface extends toward a lower end of the outlet port from an upper end of the first guide surface.

* * * * *